United States Patent [19]

Lederer

[11] 3,760,929

[45] Sept. 25, 1973

[54] LID INSPECTION MEANS

[76] Inventor: George H. Lederer, 75 Gordon Rd., Willowdale, Ontario, Canada

[22] Filed: Dec. 3, 1971

[21] Appl. No.: 204,429

[52] U.S. Cl. .................................. 198/19, 198/168
[51] Int. Cl. ............................................. B23q 5/22
[58] Field of Search ............... 198/168, 161, 33 AD, 198/183, 19

[56] References Cited
UNITED STATES PATENTS

| | | | |
|---|---|---|---|
| 2,881,903 | 4/1959 | Ahlen | 198/183 |
| 2,354,628 | 7/1944 | Whitesell | 198/33 AD |
| 1,283,949 | 11/1918 | Stevenson | 198/161 |

Primary Examiner—Evon C. Blunk
Assistant Examiner—H. S. Lane
Attorney—Robert L. Westell et al.

[57] ABSTRACT

Stacks of axially thin diametrically wide circular articles are inspected while separated on a line of contact provided by a device rotating the stack and another line of contact.

3 Claims, 4 Drawing Figures

LID INSPECTION MEANS

This invention relates to the provision for inspection of articles which are flat bodies of revolution which have been previously arranged in stacks, with their axes of revolution substantially aligned.

By "flat" in the disclosure and claims herein, I mean (in relation to a body of revolution) an article whose axial dimension is small relative to the maximum diameter of its surface of revolution.

At the present time, such articles (circular plastic lids are a good example) may be stacked with the flat faces of adjacent lids touching each other. Many such methods of stacking are available. However, the stacks must be inspected for faulty articles and the like. Such inspections have been cumbersome, requiring that the stacks be dumped into troughs and either inspected manually or transferred from the troughs to rotating machinery which rotates the lids in the stacks for inspection.

The invention is designed for cooperation with stacks of articles which are conveyed perpendicular to the substantially coincident axes of revolution of the stacks. The stacks with which the invention is concerned will usually be conveyed on an upwardly sloping path between the upper surface of an upwardly sloping platform parallel to such path and the upper side in the path direction of a conveyor bar moving over said surface and along said path.

In accord with the invention, the apparatus is arranged so that a stack of flat circular articles with the axes of the articles substantially coincident, is moved in a direction substantially perpendicular to the axes of revolution of the articles.

The stacks are supported for inspection by a longitudinally extending member and a roller or belt arranged so that the stack is supported along two lines of contact with the edges of the articles, the lines of contact being parallel to the axes of revolution of the articles. One line of contact is between the articles and a longitudinally extending element and the other line of contact is between the articles and a roller or belt. The element longitudinally extends substantially parallel to the axis of revolution of the stacked articles and the belt or roller is designed to move perpendicular to the axis of revolution.

In this arrangement, the stack is rotated by the roller or belt so that the contour of individual articles may be inspected and individual defective articles removed. It is a matter of design choice whether the longitudinally extending element, sharing the support of the stack, is rotatable or merely of low friction so that the stack may slide easily thereon.

Thus the invention provides a method, whereby stacks of flat circular articles may be inspected on a conveyor between two locations.

In the drawings which illustrate a preferred embodiment of the invention:

Figure 1:
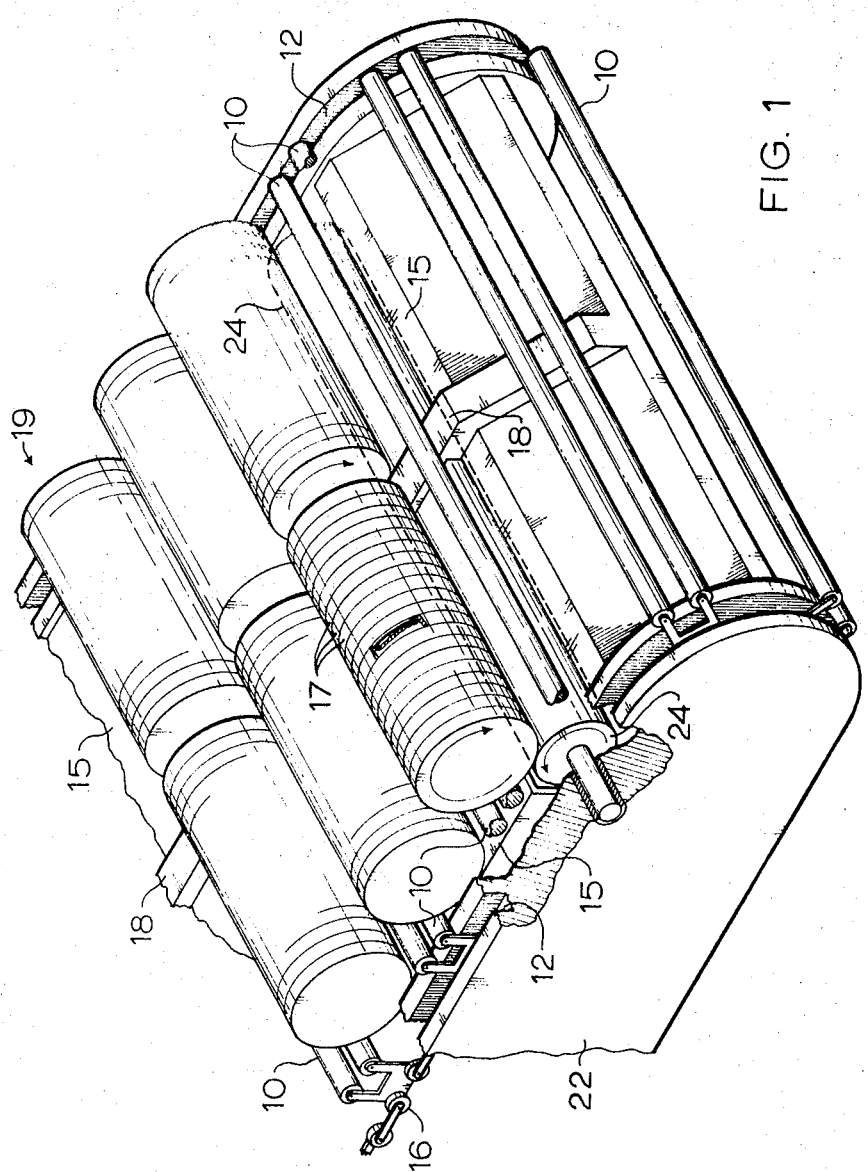
FIG. 1 shows a perspective of a device in accord with the invention.
Figure 2:
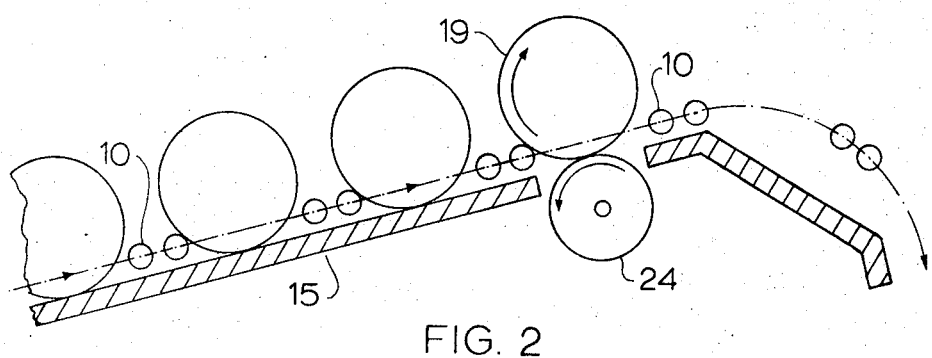
FIG. 2 shows a side schematic view of the arrangement.

In the drawings is shown, a conveyor for stacks of lids. Each lid is a flat body of revolution. In the 'stacks' discussed in this application, the lids (or other bodies) therein, are arranged with their faces adjacent and their axes substantially colinear, i.e., the axes of the lids coincide with the axis of the stacks.

There are many means well known to those skilled in the art, for arranging the articles in stacks, including apparatus and also manual methods. Also a method is shown in my application to be filed at about the same time as the present case.

The preferred conveyor, with which the invention is designed to operate, comprises a plurality of pairs of bars 10 arranged on a conveyor, with the conveying portion of the flight moving in an upwardly sloping direction on tracks 12 on base 14 and connected by chain 16 for travel perpendicular to the longitudinal extension direction of the bars 10. Underlying the upwardly moving conveyor flight is a platform 15. The height of the platform 15 relative to the height of bars 10 is chosen so that stacks of articles (here lids) are moved up the sloping platform 15, resting on the lower one of a pair of bars 10 and on the platform 15 and with a slight clearance from the upper bar 10 of the pair. Preferably, and as shown, a plurality of stacks 19 are arranged end to end and separated by stationary dividers 18 running in the extended direction of conveyor travel. The stacks 19 are composed of a plurality of flat circular articles 17, arranged face to face with their axes substantially coincident and substantially parallel to the longitudinal extension direction of the bars 10.

The details of the connection of the conveyor bars, the connecting chain, the conveyor track, the conveyor drive and the other conveyor flight are not shown in detail or not shown; since many forms are available which are well known to those skilled in the art. It will be noted that the conveyor design for the form of the invention shown in FIG. 1 should provide for intermittent movement to allow the inspection procedures contemplated by the invention.

In the preferred embodiment of the invention, the rearward bars 10 and the platform 15 support the stacks with individual articles in the stacks, resting edgewise thereon. When so resting edgewise to be thus supported, the stack defines a line of contact with the rearward bar 10 on which it rests and with the platform.

At the inspection location, there is located a power driven roller 24 and the platform 15 is terminated, so that the stacks previously supported along lines of contact on a bar 10 and platform 15 are supported on parallel lines of contact with bar 10 and driven roller 24, since the axis of the roller 24 is parallel to the longitudinal extension direction of the rearward bar 10 and perpendicular to the conveyance direction.

The roller 24 is mounted at both ends in side walls 22. The roller 24 is rotated (by power drive means, not shown) to cause rotation of the stack, and it may be desirable if the bar 10, sharing the support of the lid with the roller, is cylindrical and rotatable rather than stationary and of relatively low frictional coefficient, as shown in the specific embodiments. However, it has been found in practice, satisfactory, if the bar has a low coefficient of friction so that the lids may slide easily thereover driven by roller 24. The friction between the bar 10 and the lids is of course dependent upon the proportion of the lid's weight which is borne by the bar. In the embodiment shown, the bar 10 carries less than half of the weight of each lid.

The roller 24 at the inspection location, spins the articles in the stack, permitting inspection by an operator who may easily pick out defective lids, such as the misaligned lid shown in the drawing.

After the inspection, the conveyor, as previously explained, will step to the next position, actuated by manual or automatic means or a combination of the two. Such stepping causes the removal of the stack or stacks of lids just inspected and the positioning at the inspection location of the next stack or stacks in the conveyor line.

It will be noted that the direction of rotation of the drive roller is not found important although the stack driven by the roller will in the absence of unusual tilt or other conditions of the conveyor, usually rest against the bar toward which it is driven by the direction of rotation of the roller.

Since the inventive concept only uses the lower of a pair of bars, in combination with an upwardly sloping track, it will be obvious that the invention may be performed without the upper one of each pair of bars corresponding to a stack.

It is thus seen that there is provided an invention wherein inspection of flat circular articles may be achieved without removal from a conveyor line.

Figure 3:
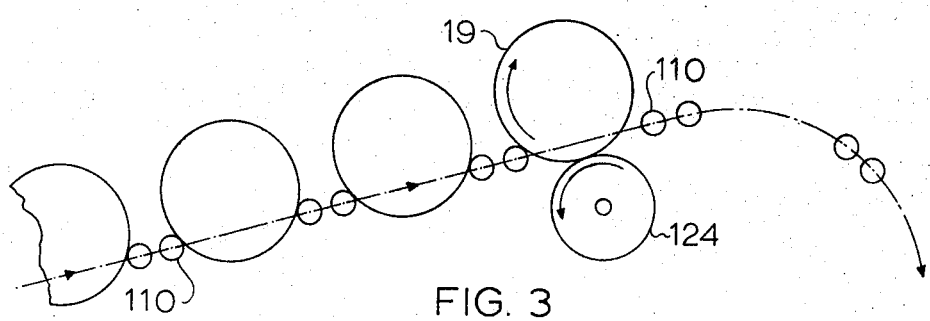
FIG. 3 shows a side schematic view of an alternative arrangement.

In FIG. 3 is schematically shown an alternative of the invention where, instead of support on a platform and a bar; are supported on the two bars 110, of a conveyor, the two bars being located closer together than in FIG. 1. At the inspection location the roller 124 is located higher than the locus of the lid edges if supported by bars 10. In the embodiment of FIG. 3, the movement of the conveyor will again be intermittent to allow inspection of the stacks at the inspection location.

Figure 4:
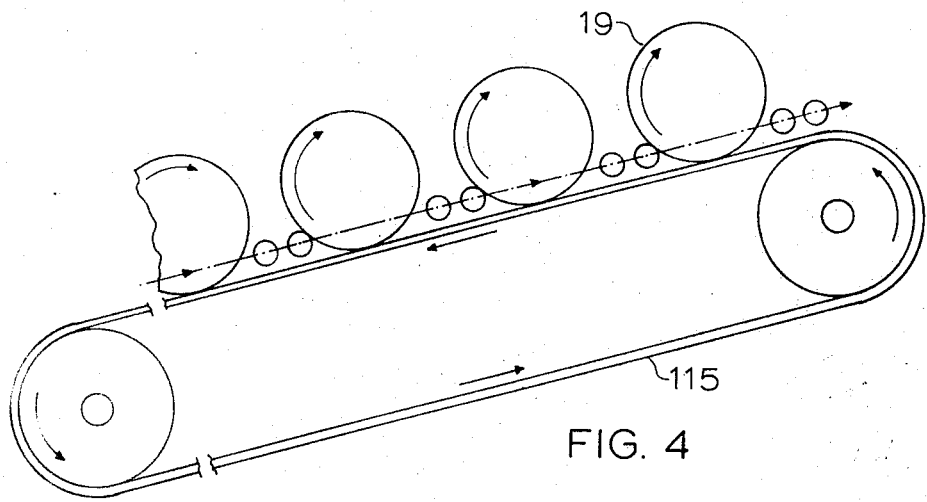
FIG. 4 shows a side schematic view of a further alternative arrangement.

In FIG. 4 the platform is replaced with a rapidly moving belt 115. The direction of rotation of the belt is not of prime importance. The stacks are moved upwardly by the lower bars 10 on a conveyor as before with the stacks supported by a line of contact on the lower bars 10 and a line of contact on the belt 115. The belt is moved sufficiently fast to rotate the lids for inspection. Since, in the embodiment of FIG. 4, the lids are rotating at all portions of their path, the conveyor motion may be continuous as the lids may be inspected at all locations.

I claim:

1. Means for processing articles for inspection which articles are bodies of revolution which are relatively wide measured radially of the axis of revolution and relatively thin measured along the axis of revolution, means for supporting a stack so constituted including:

a pair of longitudinally extending support members arranged to contact the edges of such a stack of such articles, in a stack so constituted on substantially parallel lines of contact, with such lines of contact so arranged that said articles will rest with their edges contacting said members while supported along said lines of contact, means for moving said pair of members and a stack supported thereby along a path substantially perpendicular to the axes of the articles in said stack, a drive roller provided with a surface designed to contact the edges of articles in a stack so supported, along a line of contact;

said drive roller being located and oriented to be contacted by said articles moved along said path at a location therealong, along the last-mentioned line of contact, in an orientation parallel to the lines of contact of said support members, and said drive roller being located to provide, at said location, support for said stack in combination with one of said support members, means for causing motion of said drive roller surface in a direction transverse to said line of contact whereby said articles are rotated by said surface.

2. Means as claimed in claim 1 wherein one of said support members is a sloping surface and the other of said support members is a longitudinally extending bar overlying said surface and arranged so that its line of contact with the edges of said articles is parallel to the direction of longitudinal extension of said bar, and wherein said bar is movable to move said articles up said sloping surface, wherein said sloping surface terminates adjacent said drive roller and said drive roller is located so that said stacks, passing beyond said sloping surface, are supported on said bar and said roller for location by the latter.

3. Means as claimed in claim 1 wherein said support members comprise a pair of longitudinally extending bars spaced to support a stack of such articles between them along lines of contact, respectively parallel to the longitudinal extension direction thereof, and wherein said bars are movable to move said articles along said path, wherein said drive roller is located so that said stack is conveyed by said bars to a position where said stack is supported by one of said bars and by said roller.

* * * * *